US 11,694,613 B2

(12) United States Patent
Hsieh et al.

(10) Patent No.: US 11,694,613 B2
(45) Date of Patent: Jul. 4, 2023

(54) DISPLAYS WITH PARTIAL TRANSPARENT AREAS

(71) Applicant: Hewlett-Packard Development Company, L.P., Spring, TX (US)

(72) Inventors: Hsing-Hung Hsieh, Taipei (TW); Kuan-Ting Wu, Taipei (TW); Dehuei Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,315

(22) PCT Filed: Jul. 25, 2019

(86) PCT No.: PCT/US2019/043478
§ 371 (c)(1),
(2) Date: Jun. 29, 2021

(87) PCT Pub. No.: WO2021/015790
PCT Pub. Date: Jan. 28, 2021

(65) Prior Publication Data
US 2022/0148500 A1    May 12, 2022

(51) Int. Cl.
*G09G 3/3208* (2016.01)
(52) U.S. Cl.
CPC ... *G09G 3/3208* (2013.01); *G09G 2300/0439* (2013.01); *G09G 2320/0626* (2013.01); *G09G 2360/14* (2013.01)

(58) Field of Classification Search
None
See application file for complete search history.

(56) References Cited

U.S. PATENT DOCUMENTS

| | | | |
|---|---|---|---|
| 8,154,582 B2 | 4/2012 | Border et al. | |
| 2007/0002130 A1 | 1/2007 | Hartkop | |
| 2007/0109254 A1* | 5/2007 | Kang | G09G 3/3666 345/103 |
| 2008/0106628 A1 | 5/2008 | Cok et al. | |
| 2008/0106629 A1* | 5/2008 | Kurtz | H04N 7/144 348/E5.022 |
| 2009/0009628 A1 | 1/2009 | Janicek | |
| 2014/0098184 A1 | 4/2014 | Hughes | |
| 2017/0084231 A1 | 3/2017 | Chew | |
| 2017/0124933 A1 | 5/2017 | Evans et al. | |
| 2019/0206953 A1 | 7/2019 | Hsieh et al. | |
| 2020/0020737 A1* | 1/2020 | Jin | H01L 27/3272 |
| 2020/0176542 A1* | 6/2020 | Park | G09G 3/3241 |
| 2020/0234634 A1* | 7/2020 | Li | G09G 3/3208 |
| 2020/0236259 A1* | 7/2020 | Nakamura | G02F 1/133512 |
| 2020/0320938 A1* | 10/2020 | Lee | G09G 3/3413 |

* cited by examiner

*Primary Examiner* — Chad M Dicke
(74) *Attorney, Agent, or Firm* — Quarles & Brady LLP (57) ABSTRACT

A display having an area of non-transparent pixels, an area of transparent pixels, a camera positioned behind the transparent pixels to capture an image when light passes through the transparent pixels, and a display controller for driving the non-transparent pixels at a first brightness and driving the transparent pixels at a second brightness greater than the first brightness during image capture by the camera.

17 Claims, 7 Drawing Sheets

DISPLAYS WITH PARTIAL TRANSPARENT AREAS

BACKGROUND

Displays may have an area behind which a camera may be positioned to capture images. Such displays eliminate the need for a border adjacent the display to accommodate the camera. The area may comprise transparent display pixels composed of, for example, indium tin oxide (ITO), indium zinc oxide (IZO), indium gallium zinc oxide (IGZO) and/or any other conductive material(s) having transparent characteristic(s).

Wherever possible the same reference numbers will be used throughout the drawing(s) and accompanying written description to refer to the same or like parts. The figures are not necessarily to scale and certain features and certain views of the figures can be shown exaggerated in scale or in schematic for clarity and/or conciseness.

DETAILED DESCRIPTION

Certain examples are shown in the identified figures and disclosed in detail herein. Although the following discloses example methods and apparatus, it should be noted that such methods and apparatus are merely illustrative and should not be considered as limiting the scope of this disclosure. In describing these examples, like or identical reference numbers are used to identify the same or similar elements.

Additionally, several examples have been described throughout this specification. Any features from any example can be included with, a replacement for, or otherwise combined with other features from other examples. In other words, the example disclosed herein are not mutually exclusive to each other. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

As used herein, directional terms, such as "upper," "bottom," "left," "right," etc. are used with reference to the orientation of the figures being described. Because components of various examples disclosed herein can be positioned in a number of different orientations, the directional terminology is used for illustrative purposes and is not intended to be limiting.

Example displays disclosed herein employ partial transparent areas to accommodate cameras. To this end, example displays disclosed herein eliminate the need for a border adjacent the display to accommodate a camera. As a result, example displays disclosed herein enable a smaller border adjacent the display and/or increase a viewing area of a display, as examples. Additionally, the camera is positioned behind the transparent area of the display. Example displays disclosed herein can be implemented as an organic light emitting diode (OLED).

To provide the transparent area, an example display of this disclosure includes source and gate lines (e.g., conductive traces) that include first portions composed of a first material (e.g., an opaque material, a metallic material) and second portions composed of a second material (e.g., a transparent material) different than the first material. For example, the first material provides a non-transparent or an opaque characteristic to the display and the second material provides a transparent characteristic to the display, wherein pixels in the first portion are non-transparent pixels and pixels in the first portion are transparent pixels. In this manner, an electronic device such as a camera can be positioned underneath or behind the transparent portion of the display.

To prevent light emitted by the display from passing through the transparent pixels and thereby affecting image capture by the camera, the transparent display pixels may be turned off during image capture. However, turning off the transparent display pixels may result in a noticeable visual artifact due to reduced image brightness in the region of the transparent display pixels.

Figure 1A:
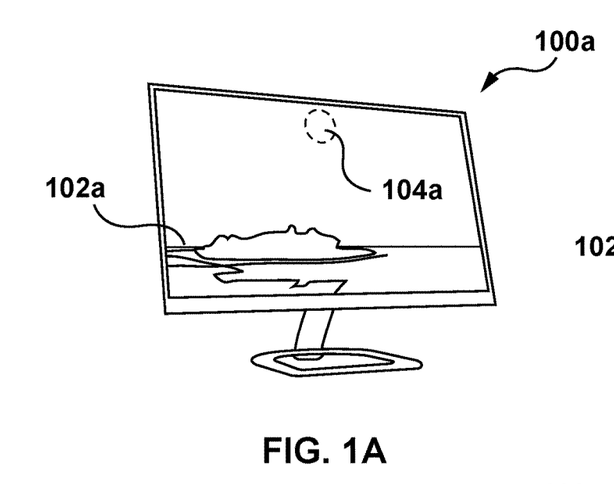
FIGS. 1A-1D are example electronic devices that can employ example displays constructed in accordance with the teachings disclosed herein.
Figure 1B:
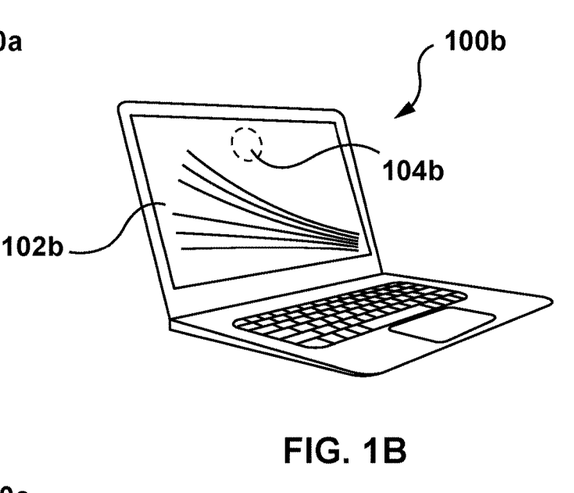
Figure 1C:
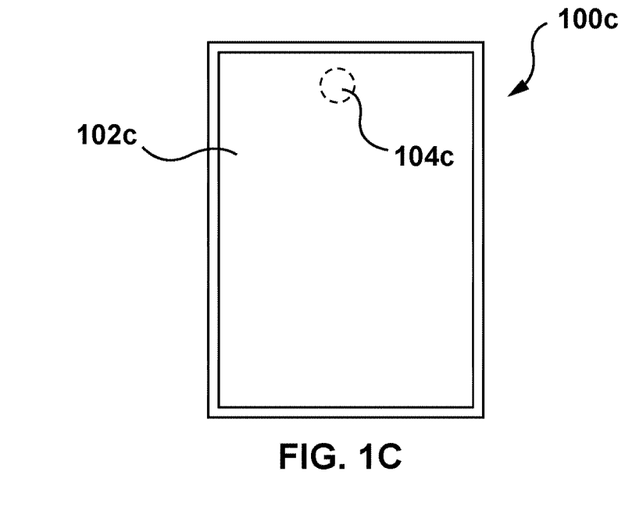
Figure 1D:
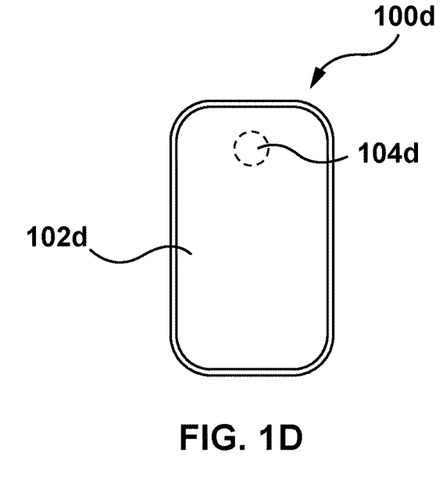

Turning more specifically to the illustrated examples, FIGS. 1A-1D illustrate example electronic devices 100a-d that can be implemented with example displays 102a-d constructed in accordance with the teachings of this disclosure. For example, the electronic device 100a of FIG. 1A is a monitor, the electronic device 100b of FIG. 1B is a notebook computer, the electronic device 100c of FIG. 1C is a tablet, and the electronic device 100d of FIG. 1D is a mobile device. In some examples, the electronic device can include a television, a sign, and/or any other electronic device that has a display. The electronic devices 100a-d include cameras 104a-d positioned underneath transparent portions of the displays 102a-d. For example, the cameras 104a-d are positioned behind the displays 102a-d such that the displays 102a-d overlap the cameras 104a-d.

As used herein, the term "transparent" refers to a quality of a material that allows visible light to pass through, and the term "opaque portion" refers to a quality of a material that allows less amount of visible light to pass through than the transparent portion. In some examples, a transparent portion enables more than 10% of light to pass through. In some examples, a transparent portion enables more than 50% of light to pass through. In some examples, a transparent portion enables between approximately 30% and 80% of light to pass through. In some examples, a translucent material is considered a transparent material. In some examples, an opaque portion prevents more than 90% of light from passing through. Thus, in some examples, an opaque portion does enable the transmission of a low amount of light. In some examples, an opaque portion is considered a non-transparent portion.

Figure 2:
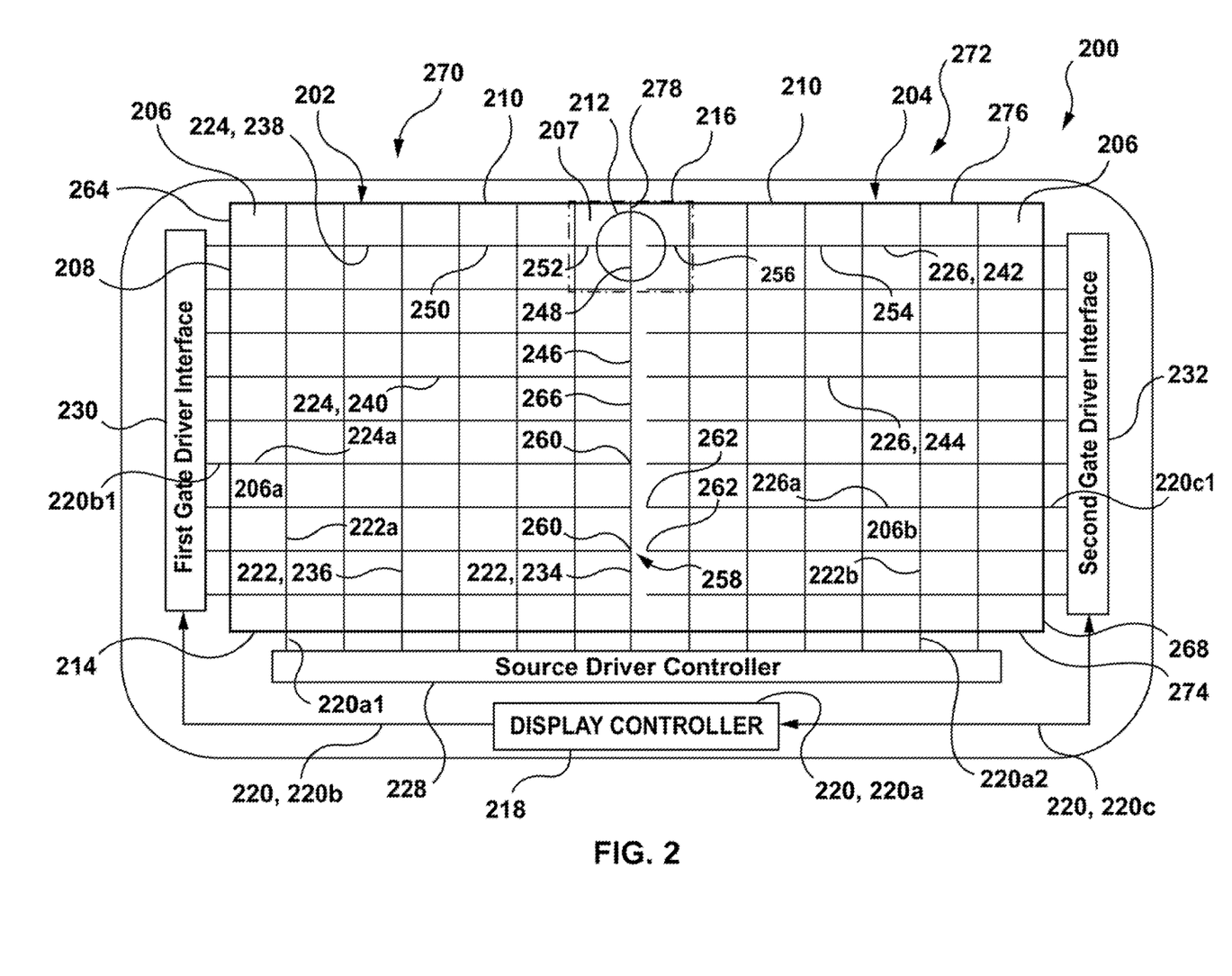
FIG. 2 is a block diagram of an example display disclosed herein.

FIG. 2 illustrates an example display 200 that can implement the example displays 102a-d of FIGS. 1A-1D. By way of example, the display 200 of the illustrated example includes an OLED display panel. However, in some examples, the display 200 of the illustrated example can include a light emitting diode (LED) display panel, and/or any other display panel(s) or element(s). In some examples, the display 200 of the illustrated example may include a touch sensitive display panel. As used herein, the term "display" refers to a device and/or a combination of devices that are used to present information in a visual form.

The display 200 of the illustrated example includes a viewing area 202 defined by a pixel array 204. For example, the pixel array 204 can be formed by several layers of material(s), such as a cover/glass layer, a color filter layer, a display layer including light emitting diodes or organic light emitting diodes, a thin film transistor layer, insulator layers, etc. The pixel array 204 of the illustrated example includes a plurality of non-transparent pixels 206 and transparent pixels 207. Specifically, the pixels 206 and 207 of the pixel array 204 of the illustrated example are formed in rows 208 and columns 210 (e.g., tens, hundreds, thousands, or more rows and/or columns) and are activated or deactivated in a precise or timed pattern to generate a desired image in the viewing area 202, as discussed in greater detail below.

Additionally, the display 200 of the illustrated example includes a camera 212. By way of example, the camera 212 of the illustrated example is positioned underneath (e.g., behind) the display 200 (e.g., a display panel). For example, the camera 212 of the illustrated example is positioned between the display 200 (e.g., a substrate of the display 200) and a housing of an electronic enclosure of an electronic device (e.g., the electronic devices 100a-d of FIGS. 1A-1D). In other words, the camera 212 is positioned to capture an image through the display 200.

To enable the camera 212 to capture an image through the display 200, the display 200 of the illustrated example includes a first area 214 (e.g., an area including pixels 206 that have opaque or non-transparent characteristic(s)) and a second area 216 (e.g., an area including pixels 207 that have substantially transparent or translucent characteristic(s) and represented by a dashed boundary line in FIG. 2). The second area 216 is disposed above and/or overlaps the camera 212 to allow light to pass from outside of the display (e.g., an upper or outer surface of the display 200) to the camera 212 to enable the camera 212 to record or capture an image through the display 200.

To present an image on the viewing area 202, the display 200 of the illustrated example includes a display controller 218. The display controller 218 of the illustrated example communicates or controls the pixels 206 and 207 of the pixel array 204 to present an image on the viewing area 202. The display controller 218 generates signals 220 to operate the respective ones of the pixels 206 and 207.

To communicate first signals 220a to (e.g., to activate/deactivate) the pixels 206 and 207 of the pixel array 204, the display 200 of the illustrated example includes a set of source lines 222. To communicate second signals 220b to (e.g., activate/deactivate) the pixels 206 and 207 of the pixel array 204, the display 200 of the illustrated example includes a first set of gate lines 224. To communicate third signals 220c to (e.g., activate/deactivate) the pixels 206 and 207 of the pixel array 204, the display 200 of the illustrated example includes a second set of gate lines 226. The source lines 222, the first set of gate lines 224, and the second set of gate lines 226 of the illustrated example are communicatively coupled to the display controller 218 via a source driver interface 228, a first gate driver interface 230, and a second gate driver interface 232, respectively.

The display 200, via the signals 220 from the display controller 218, can present an image by controlling the non-transparent pixels 206 in the first area 214 (e.g., an opaque area) of the viewing area 202 and the transparent pixels 207 in the second area 216 (e.g., a transparent area) of the viewing area 202. Thus, although the display 200 of the illustrated example includes the first area 214 and the second area 216, the first area 214 and the second area 216 provide a seamless viewing area when presenting an image. In other words, an image can be presented on both the first area 214 and the second area 216 without affecting (e.g., degrading a quality of) an image presented across the first area 214 and the second area 216 of the viewing area 202. Thus, an image can be presented across the viewing area 202 (e.g., the entire viewing area 202) of the display 200 including the pixels 207 corresponding to the second area 216.

The source lines 222 of the illustrated example include a first source line 234 and a second source line 236. The first set of gate lines 224 of the illustrated example include a first gate line 238 and a second gate line 240. The second set of gate lines 226 of the illustrated example include a third gate line 242 and a fourth gate line 244. Additionally, the first source line 234 of the illustrated example includes a first portion 246 composed of a first material and a second portion 248 composed of a second material different than the first material. Similarly, the first gate line 238 of the illustrated example includes a first portion 250 composed of the first material and a second portion 252 composed of the second material. Likewise, the third gate line 242 of the illustrated example includes a first portion 254 composed of the first material and a second portion 256 composed of the second material. The second source line 236, the second gate line 240, and the fourth gate line 244 of the illustrated example are composed of the first material.

The first material of the illustrated example can be an opaque or non-transparent conductor composed of a metallic material such as, for example, copper, aluminum, titanium, silver, molybdenum, composition or stacked layers of these materials, and/or any other suitable conductive material(s) having opaque characteristic(s). The second material of the illustrated example can be a transparent conductor composed of, for example, indium tin oxide (ITO), indium zinc oxide (IZO), indium gallium zinc oxide (IGZO) and/or any other conductive material(s) having transparent characteristic(s). To provide the first area 214, the first portions 246, 250, 254 of the respective first source line 234, the first gate line 238, and the third gate line 242 are composed of the first material (e.g., an opaque conductor). Additionally, to provide the first area 214, the second source line 236, the second gate line 240, and the fourth gate line 244 are composed of the first material. To provide the second area 216, the second portion 248 of the first source line 234, the second portion 252 of the first gate line 238, and the second portion 256 of the third gate line 242 of the illustrated example are composed of the second material (e.g., a transparent conductor). For example, the first portions 246, 250, 254 of the respective first source line 234, the first gate line 238, and the third gate line 242 and the second source line 236, the second gate line 240, and the fourth gate line 244 defining the first area 216 have a first resistivity characteristic or property. The second portion 248 of the first source line 234, the second portion 252 of the first gate line 238, and the second portion 256 of the third gate line 242 of the illustrated example have a second resistivity characteristic or property. The first resistivity characteristic is different than (e.g., less than) the second resistivity characteristic.

Additionally, the transparent conductive material(s) forming the second portions 248, 252, 256 of the respective first source line 234, the first gate line 238, and the third gate line 242 of the illustrated example have relatively high resistive characteristic(s). To this end, to avoid signal degradation of the signals 220 provided by the display controller 218 to the pixels 207 in the second area 216, the first set of gate lines 224 is electrically isolated from the second set of gate lines 226. To electrically isolate the first set of gate lines 224 and the second set of gate lines 226, gaps 258 (e.g., discontinuities or spaces) are provided (e.g., formed) between terminating ends 260 of the first set of gate lines 224 and terminating ends 262 of the second set of gate lines 226. To this end, the first set of gate lines 224 of the illustrated example extend between a first edge 264 (e.g., a left side edge in the orientation of FIG. 2) of the display 200 and a midsection 266 (e.g., a center) of the display 200, and the second set of gate lines 226 of the illustrated example extend between a second edge 268 (e.g., a right side edge in the orientation of FIG. 2) of the display 200 and the midsection 266. Thus, the first set of gate lines 224 are associated with the pixels 206 and 207 of a first portion 270 (e.g., a first half between the first edge 264 and the midsection 266) of the viewing area 202 of the display 200, and the second set of gate lines 226 are associated with the pixels 206 and 207 of a second portion 272 (e.g., a second half between the second edge 268 and the midsection 266) of the viewing area 202 of the display 200. Additionally, the source lines 222 extend between a third edge 274 (e.g., a bottom edge in the orientation of FIG. 2) of the display 200 and a fourth edge 276 (e.g., an upper edge in the orientation of FIG. 2) of the display 200 opposite the third edge 274. To this end, the second portion 248 of the first source line 234 defines a terminating end 278 of the first source line 234. Thus, the second portion 248 of the first source line 234 does not degrade the signals 220 from the display controller 218 given that the second portion 248 of the first source line 234 is positioned at a terminating end 278 of the first source line 234.

As a result of the gaps 258, the second portion 248 of the first source line 234, the second portion 252 of the first gate line 238, and the second portion 256 of the third gate line 242 that are formed with the transparent conductors are positioned at the terminating ends 278, 260, 262 of the respective first source line 234, the first gate line 238, and the third gate line 242. Positioning the transparent conductors at the terminating ends 278, 260, 262 of the respective first source line 234, the first gate line 238, and the third gate line 242 reduces degradation and/or interference with the signals 220 that can otherwise occur if the transparent conductors of the first gate line 238 and the third gate lines 242 are not separated by the gaps 258 (i.e., if the terminating ends 260, 262 were electrically coupled and the first gate line 238 and the third gate line 242 were formed as a unitary gate line). Further, positioning the transparent conductor of the first source line 234 at the terminating end 278 of the first source line 234 reduces degradation and/or interference with the signals 220. In the illustrated example, the second area 216 of the display 200 is formed adjacent the midsection 266 and the fourth edge 276 of the display 200. To this end, the camera 212 is positioned adjacent the terminating end 278 of the first source line 234, the terminating end 260 of the first gate line 238, and the terminating end 262 of the third gate line 242. Thus, the camera 212 is disposed adjacent the second portions 248, 252, 256 of the respective first source line 234, the first gate line 238, and third gate line 242.

To generate or present an image on the display 200 or to control an image presented on the display 200, the source lines 222 and the first set of gate lines 224 activate or deactivate the pixels 206 and 207 of the first portion 270 of the viewing area 202, and the source lines 222 and the second set of gate lines 226 activate or deactivate the pixels 206 and 207 of the second portion 272 of the viewing area 202. For example, the display controller 218 communicates a first signal 220a1 to a first pixel 206a of the first portion 270 via a first source line 222a and a second signal 220b1 to a first one 224a of the first set of gate lines 224 to control a gate of the first pixel 206a (e.g., a pixel RGB). Likewise, the display controller 218 communicates a third signal 220a2 to a second pixel 206b of the second portion 272 via a second source line 222b and a fourth signal 220c1 to a first one 226b of the second set of gate lines 226 to control a gate of the second pixel 206b (e.g., a pixel RGB).

In some examples, the first source line 234, the first gate line 238, and the third gate line 242 are illustrated having the respective first portions 246, 250, 254 and the respective second portions 248, 252, 256 for simplicity and/or discussion purposes. However, the display 200 of the illustrated example may be implemented with a plurality of the first source lines constructed identical to the first source line 234, a plurality of the first gate lines constructed identical to the first gate line 238, and a plurality of the third gate lines constructed identical to the third gate line 242 to implement or define the second area 216 of the display 200. For example, the display 200 of the illustrated example can include hundreds or thousands of first source lines 234, hundreds or thousands of first gate lines 238, and/or hundreds or thousands of third gate lines 242.

Figure 3:
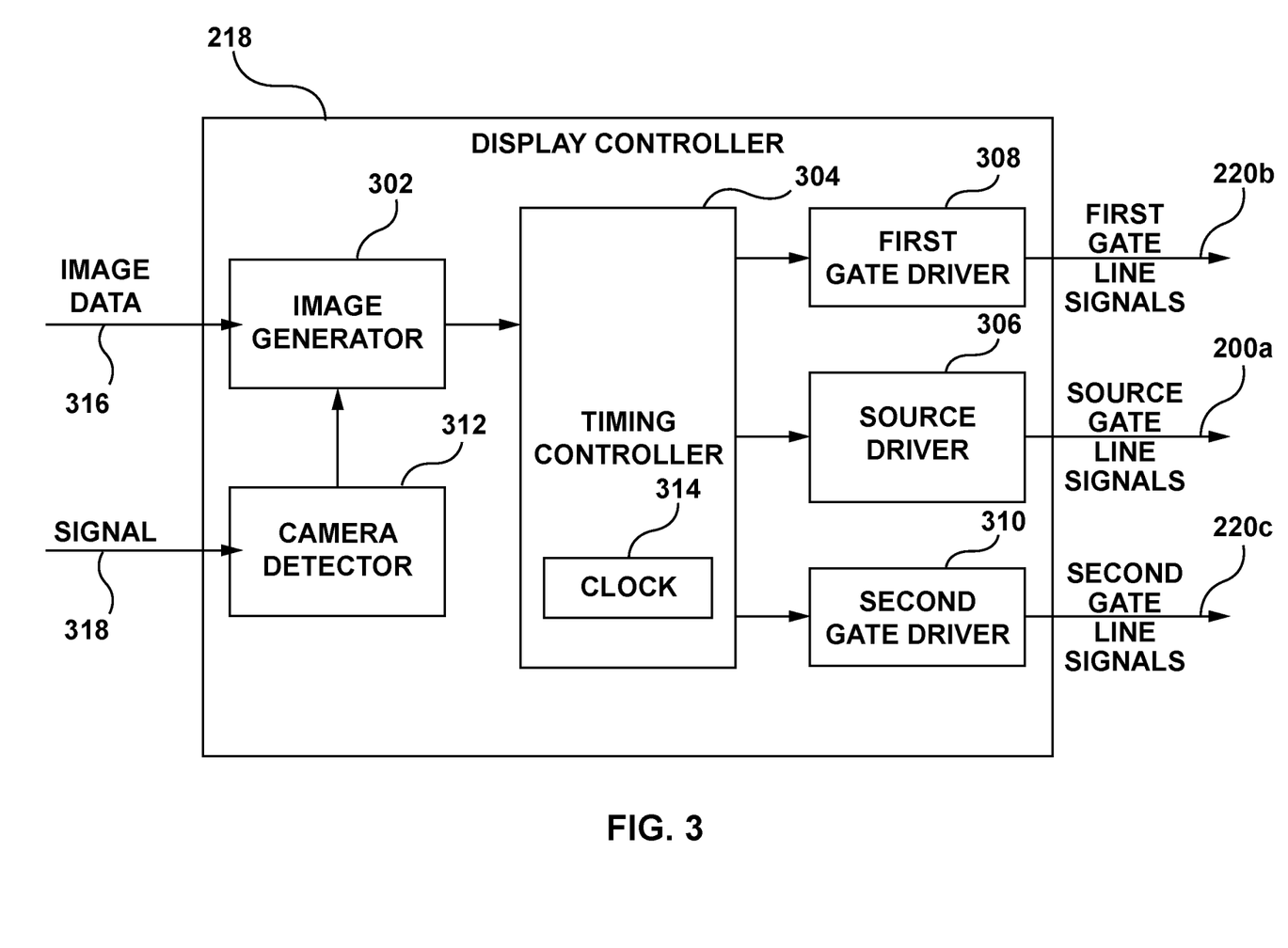
FIG. 3 is a block diagram of an example display controller for controlling the example display of FIG. 2.

FIG. 3 is a block diagram of an example display controller 218 of FIG. 2. The example display controller 218 of the illustrated example includes an example image generator 302, an example timing controller 304, an example source driver 306, an example first gate driver 308, an example second gate driver 310, and a camera detector 312. The timing controller 304 of the illustrated example includes an example clock 314. In some examples, the example image generator 302, the example timing controller 304, the example source driver 306, the example first gate driver 308, and the example second gate driver 310 are in communication (e.g., via a communication bus, by writing and reading data from a memory, etc.).

The image generator 302 of the illustrated example provides the display 200 with content that is to be displayed on the viewing area 202. The content may include still image content and/or moving image content such as, for example, video content for a movie, moving graphics, or other moving image content representative by image data 316. The image data 316 to be processed by the display 200 can be conveyed or transferred to the display controller 218 over a data path (e.g., a flexible circuit cables, input/output interface (e.g., an HDMI interface, a USB interface, etc.)). The image generator 302 converts the image data 316 to corresponding data signals to be provided to the pixels 206 and 207 of the pixel array 204. In some examples, the image generator 302 can convert digital signals from the image data 316 to analog signals for the first gate driver 308, the second gate driver 310, and/or the source driver 306. For example, the image generator 302 converts the image data 316 to the signals 220 (e.g., voltage signals (Vdata)) for respective ones of the source lines 222, the first set of gate lines 224, and the second set of gate lines 226. Thus, in some examples, the image generator 302 can include an analog-to-digital converter and/or other components or converters to convert the image data 316.

To control activation of the pixels 206 and 207 of the pixel array 204, the display controller 218 of the illustrated example includes the source driver 306, the first gate driver 308, and the second gate driver 310. The source driver 306 of the illustrated example provides the first signals 220a (e.g., voltage signals, current signals, etc.) from the image generator 302 to the source lines 222. The first gate driver 308 of the illustrated example provides the second signals 220b (e.g., voltage signals, current signals, etc.) from the image generator 302 to the first set of gate lines 224. The second gate driver 310 of the illustrated example provides the third signals 220c (e.g., voltage signals, current signals, etc.) from the image generator 302 to the second set of gate lines 226.

For example, for a particular image, the image generator 302 and/or the source driver 306 of the illustrated example determines which pixels 206 and 207 of the pixel array 204 to activate for generating the image and distributes the first signals 220a to the pixels 206 and 207 via the source lines 222. Additionally, the image generator 302 and/or the first gate driver 308 determines which pixels 206 and 207 of the pixel array 204 to activate for generating the image and provides the second signals 220b (e.g., voltage signals, current signals, etc.) to the pixels 206 and 207 associated with the first set of gate lines 224. Likewise, the image generator 302 and/or the second gate driver 310 determines which pixels 206 and 207 of the pixel array 204 to activate for generating the image and provides the third signals 220c (e.g., voltage signals, current signals, etc.) to the pixels 206 and 207 associated with the second set of gate lines 226.

To control or coordinate timing of first signals 220a from the source driver 406 to respective ones of the source lines 222, the second signals 220b from the first gate driver 308 to respective ones of the first set of gate lines 224, and the third signals 220c from the second gate driver 310 to respective ones of the second set of gate lines 226, the display 200 of the illustrated example includes the timing controller 304. The timing controller 304 includes clock 314 to enable proper timing and/or activation of the pixels 206 and 207 of the pixel array 204 to generate an image on the viewing area 202.

The camera detector 312 determines when the camera 212 is in use. To determine when the camera 212 is in use, the camera detector 312 receives a signal 318. The signal 318 may be provided by a camera application of an electronic device (e.g., the electronic devices 100a-e) representative of the camera application being in an active condition (e.g., a non-sleep mode or an in-use mode). The camera detector 312 communicates a status of the camera 212 to the image generator 302. When the camera detector 312 detects that the camera 212 is in use, the image generator 302 provides commands to the source driver 306, the first gate driver 308, and/or the second gate driver 310 to deactivate the pixels 207 that overlap the camera 212 and/or define the second area 216 of the viewing area 202 of the display 200. In this manner, an image being presented across the second area 216 can be removed when the camera 212 is in use so that the presented image does not interfere with the operation of the camera 212.

While an example manner of implementing the display controller 218 of FIG. 2 is illustrated in FIG. 3, one or more of the elements, processes, and/or devices illustrated in FIG. 3 may be combined, divided, re-arranged, omitted, eliminated, and/or implemented in any other way. Further, the example image generator 302, the example timing controller 304, the example source driver 306, the example first gate driver 308, the example second gate driver 310, the camera detector 312, the clock 314, and/or, more generally, the example display controller 218 of FIG. 3 may be implemented by hardware, machine-readable instructions, or a combination thereof. Thus, for example, any of the example image generator 302, the example timing controller 304, the example source driver 306, the example first gate driver 308, the example second gate driver 310, the camera detector 312, the clock 314, and/or, more generally, the example display controller 218 of FIG. 3 may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). Further still, the example display controller 218 of FIG. 3 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, with or without direct physical (e.g., wired) communication and/or constant communication, but rather additionally includes selective communication at periodic intervals, scheduled intervals, aperiodic intervals, and/or one-time events.

Figure 4:
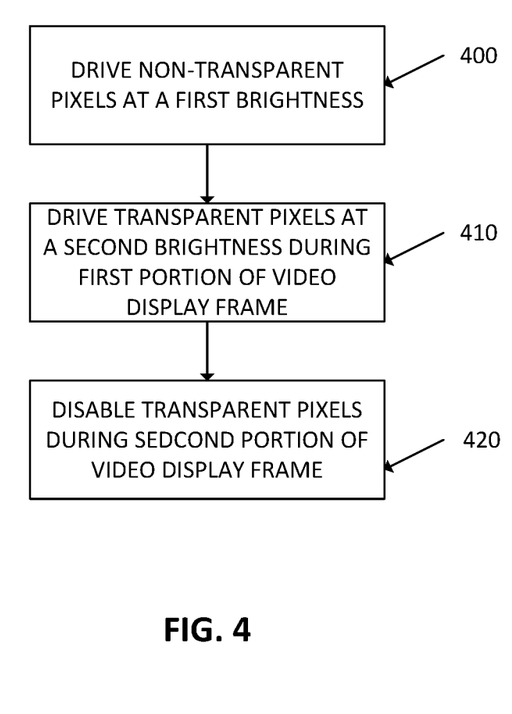
FIG. 4 is a flowchart showing a method of controlling illumination of a display according to an example.
Figure 5A:
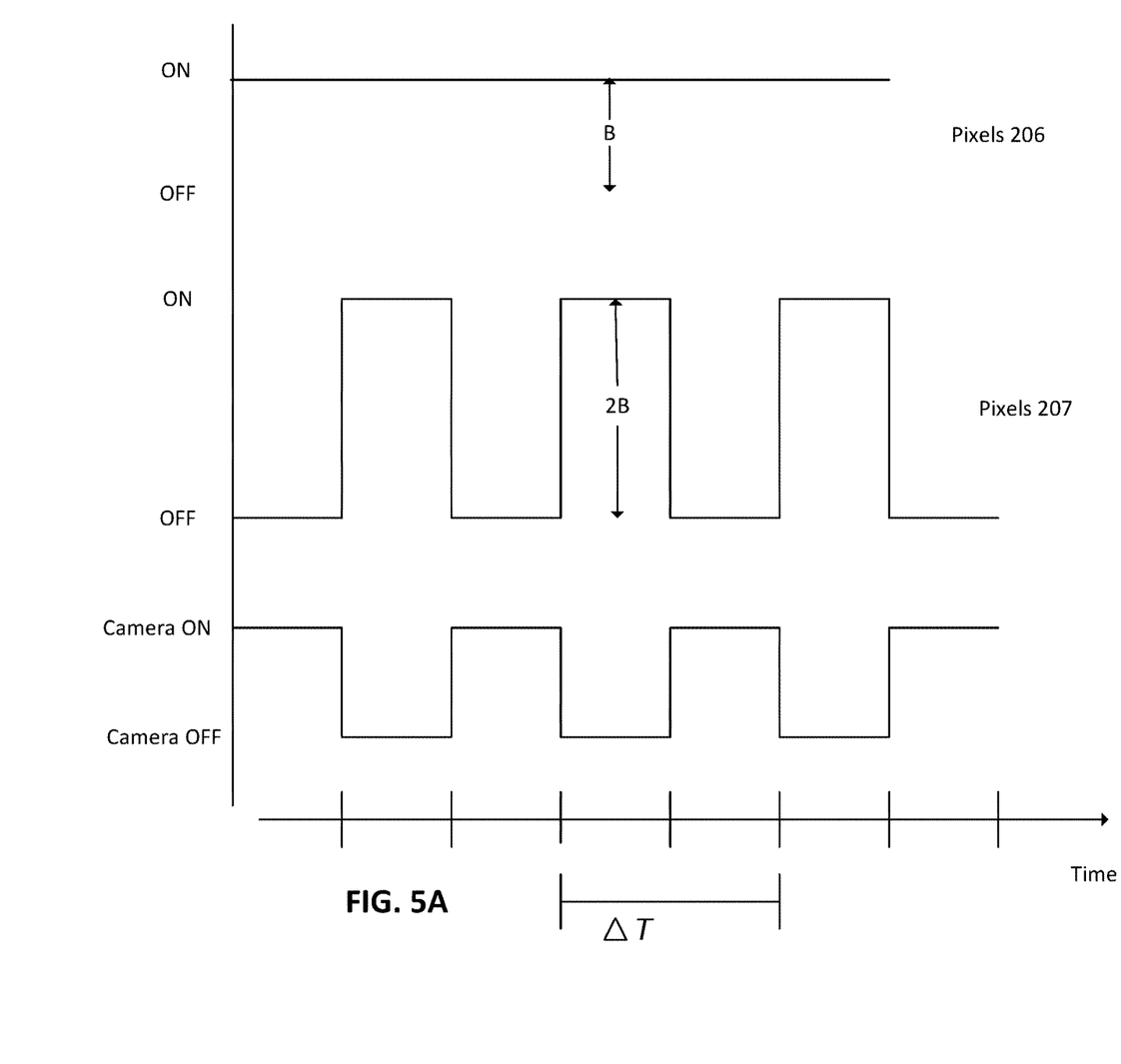
FIG. 5A is a timing diagram for image display and camera capture according to an example.
Figure 5B:
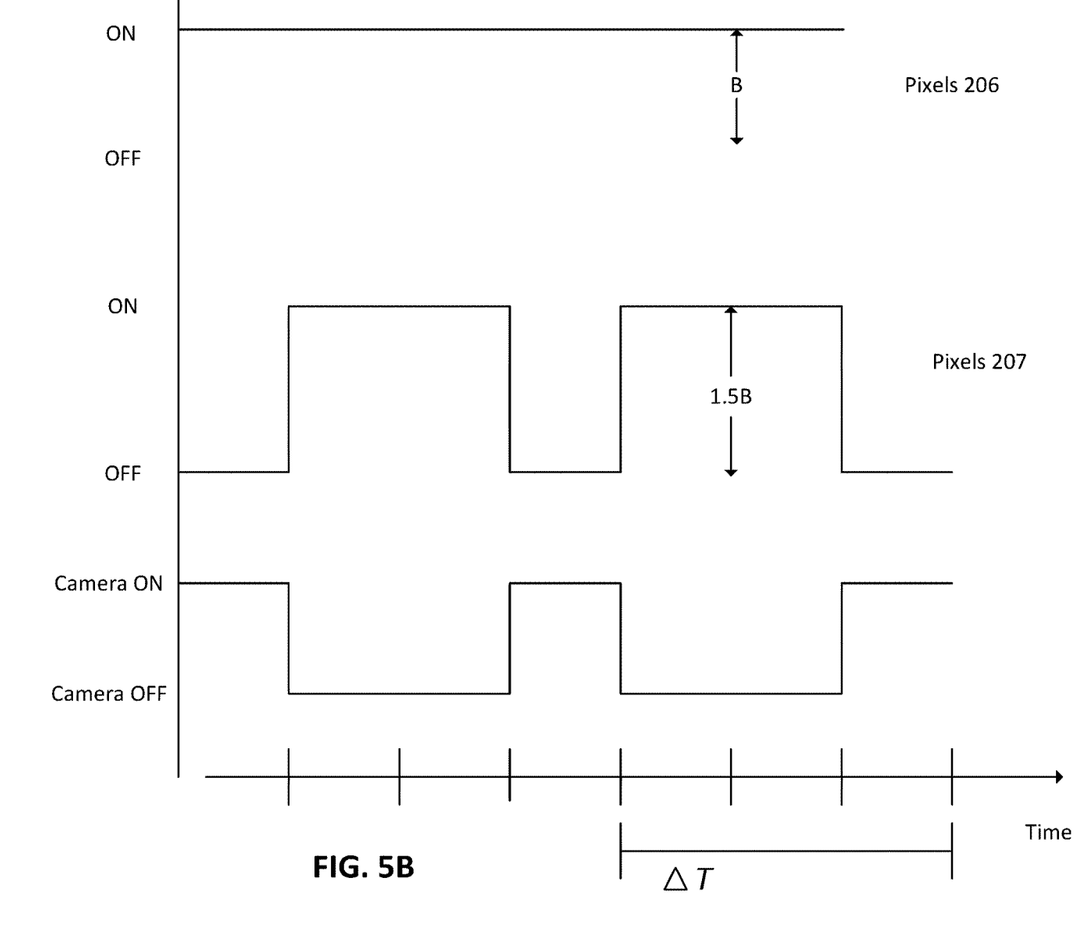
FIG. 5B is a timing diagram for image display and camera capture according to an alternative example.

FIG. 4 is a flowchart showing a method of controlling illumination of the pixels 206 in the first area 214 (e.g., an opaque area) of the viewing area 202 and pixels 207 in the second area 216 (e.g., a transparent area) of the viewing area 202, by operation of the display controller 218 sending signals to the source driver 306, the first gate driver 308, and the second gate driver 310, as set forth above. FIGS. 5A and 5B show timing diagrams for illumination of the pixels 206 and 207 relative to the timing of image capture by camera 212.

At block 400, display controller 218 drives non-transparent pixels 206 at a first brightness (B) to generate a portion of the image in area 214.

At block 410, display controller 218 drives transparent pixels 207 at a second brightness greater than the brightness (B) during a first portion of a video display frame while camera 212 is off, to generate a portion of the image in area 216.

Driving transparent pixels 207 at a greater brightness prevents image artifacts (i.e. compensates for reduced image brightness in the area 216 while the camera 212 is capturing image) because of the human eye integrating between no brightness (during image capture) and higher brightness (when the camera is off) to an average brightness over time. Absent driving transparent pixels 207 to the higher brightness, the eye would perceive a noticeable visual artifact because area 216 would appear darker than area 214 of the display 200.

At block 420, display controller 218 disables pixels 207 during a second portion of the video display frame (i.e. during image capture by camera 212).

The video display frame $\Delta T$ is shown in FIGS. 5A and 5B, wherein the duty cycle of the first portion to the second portion in the example of FIG. 5A is 1:1 while the duty cycle of the first portion to the second portion is 1:2 in the example of FIG. 5B.

Because the duty cycle in the example of FIG. 5A is 1:1, the brightness of the transparent pixels 207 is increased to approximately twice the brightness (2 B) of the non-transparent pixels 206.

Because the duty cycle in the example of FIG. 5B is 1:2, the brightness of the transparent pixels 207 is increased by approximately 50% of the brightness (1.5 B) of the non-transparent pixels 206.

Although the examples of FIGS. 5A and 5B set forth operation of the camera capture with video display frame ratios of 1:1 and 1:2, it is contemplated that other ratios may be used, with proportional adjustment of the brightness increase for non-transparent pixels 207 while the camera is off.

In some examples, the flowchart of FIG. 4 may be representative of example machine-readable instructions for implementing the blocks of the method set forth in FIG. 4. For example, the machine-readable instructions may include a program for execution by a processor (e.g., a processor similar to a processor 612 shown in the example processor platform 600 of FIG. 6). The program may be stored on a non-transitory computer-readable storage medium such as a CD-ROM, a floppy disk, a hard drive, a digital versatile disk (DVD), a Blu-ray disk, or a memory associated with the processor, but the entire program and/or parts thereof could alternatively be executed by a device other than the processor and/or embodied in dedicated hardware. Further, although the example program is described with reference to the blocks illustrated in the flowchart of FIG. 4, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation.

As mentioned above, the example method of FIG. 4 may be implemented using coded instructions (e.g., computer and/or machine readable instructions) stored on a non-transitory computer and/or machine-readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

Figure 6:
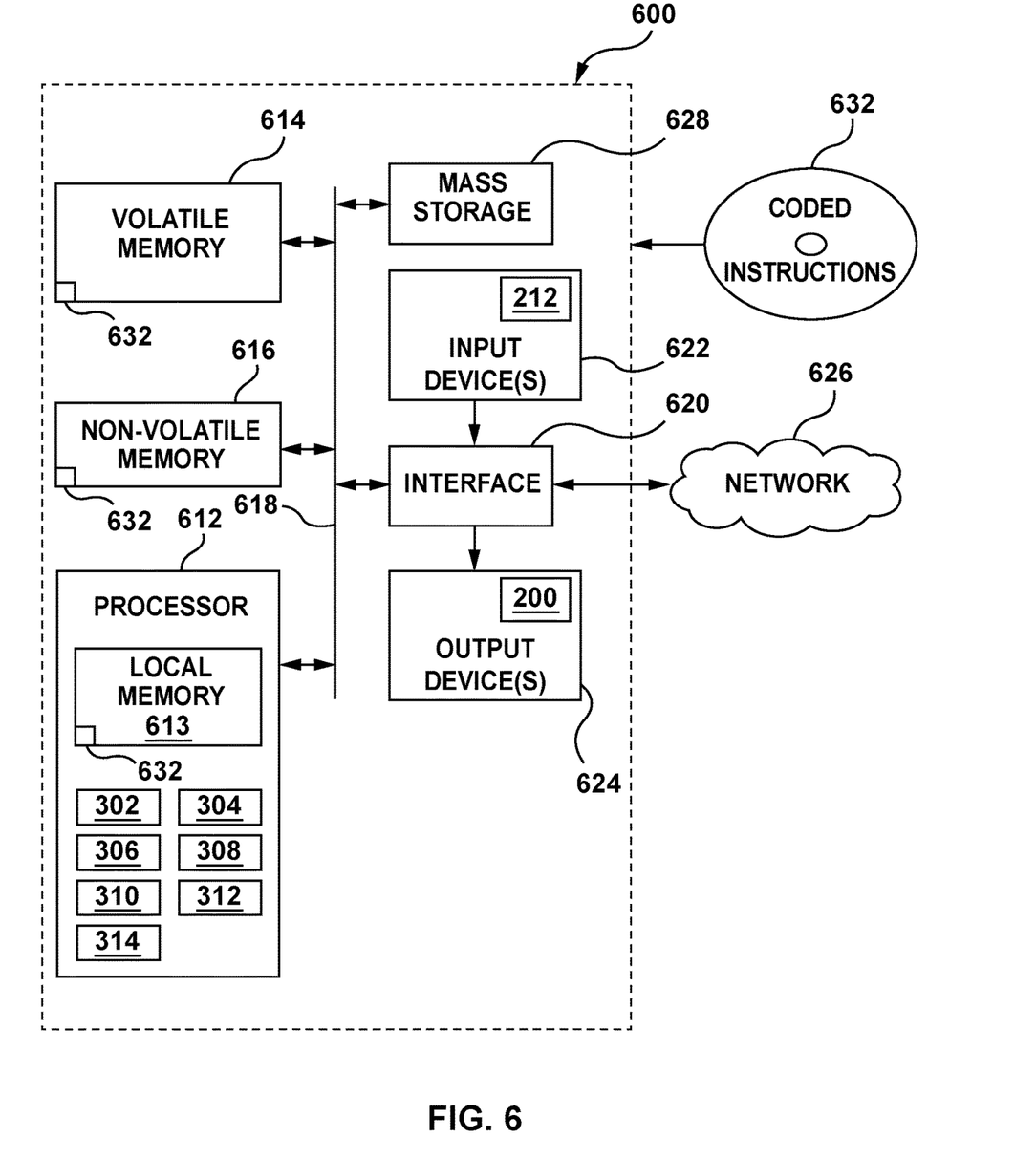
FIG. 6 is a block diagram of an example machine that may be used to implement the example methods and apparatus disclosed herein.

FIG. 6 is a block diagram of an example processor platform 600 structured to execute the instructions to implement the method of FIG. 4 for operating display controller 218 to control illumination of the pixels 206 in the first area 214 (e.g., an opaque area) of the viewing area 202 and pixels 207 in the second area 216 (e.g., a transparent area) of the viewing area 202. The processor platform 600 can be, for example, a server, a personal computer, a workstation, a self-learning machine (e.g., a neural network), a mobile device (e.g., a cell phone, a smart phone, a tablet computer), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the image generator 302, the camera detector 312, the timing controller 304, the first gate driver 308, the second gate driver 310, the source driver 306 and the clock 314.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint, and/or a voice recognition system.

Output devices 624 are also connected to the interface circuit 620 of the illustrated example. The output devices 624 can be implemented, for example, by display devices (e.g., a light emitting diode (LED), an organic light emitting diode (OLED), a touchscreen, etc.), a tactile output device, a printer, and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes mass storage devices 628 for storing machine-readable instructions and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 to implement the display controller 218 may be stored in the mass storage device 628, in the volatile memory 614, in the non-volatile memory 616, and/or on a removable non-transitory computer-readable storage medium such as a CD or DVD.

From the foregoing, it will be appreciated that the disclosed methods, apparatus, and articles of manufacture enable a camera of an electronic device to be positioned behind a display and compensate for visual artifacts by driving the transparent pixels to a higher brightness results so that the human eye integrates to an average brightness over time. The example methods, apparatus, and articles of manufacture disclosed herein enable use of a transparent, conductive material(s) to support source lines and gate lines of a display. Additionally, the gate lines and source lines incorporating the transparent portions can be electrically isolated and/or controlled independently from each other to prevent degradation of signals or commands when driving pixels associated with or corresponding to gate lines and the source lines, thereby improving accuracy and/or quality of an image presented on the display.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A method of controlling illumination of a display having non-transparent pixels and transparent pixels that define a transparent area of the display behind which a camera is positioned, comprising:
    driving the non-transparent pixels at a first brightness;
    driving the transparent pixels at a second brightness greater than the first brightness during a first portion of a video display frame in which the camera is not performing image capture, using gate lines that respectively extend from opposite sides of the display towards each other into the transparent area and using a source line, the gate lines electrically isolated from each other in the transparent area, the gate lines and the source line comprising transparent material in the transparent area and non-transparent material outside the transparent area, and the gate lines and the source line having respective terminating ends located in the transparent area and that comprise the transparent material in the transparent area; and
    disabling the transparent pixels during a second portion of the video display frame in which the camera is performing image capture.

2. The method of claim 1, wherein a difference in brightness between the second brightness and first brightness is proportional to a duty cycle of the first portion to the second portion.

3. The method of claim 1, wherein a duty cycle of the first portion to the second portion is 1:1 and the second brightness is approximately twice the first brightness.

4. The method of claim 1, wherein a duty cycle of the first portion to the second portion is 1:2 and the second brightness is approximately 50% greater than the first brightness.

5. A display comprising:
    an area of non-transparent pixels;
    an area of transparent pixels;
    a camera positioned behind the transparent pixels to capture an image when light passes through the transparent pixels;
    a display controller to drive the non-transparent pixels at a first brightness, drive the transparent pixels at a second brightness greater than the first brightness when the camera is not capturing the image, and disable the transparent pixels when the camera is capturing the image;
    a plurality of source lines including a first source line composed of a non-transparent material and a transparent material, and a second source line composed of the non-transparent material;
    a first set of gate lines including a first gate line composed of the non-transparent material and the transparent material, and a second gate line composed of the non-transparent material; and
    a second set of gate lines including a third gate line composed of the non-transparent material and the transparent material, and a fourth gate line composed of the non-transparent material,
    wherein the transparent material of the first source line, the first gate line, and the third gate line define a transparent area of the display,
    wherein the first gate line and the third gate line extend from opposite sides of the display towards each other into the transparent area,
    wherein respective terminating ends of the first gate line, the third gate line, and the first source line are located in the transparent area and comprise the transparent material in the transparent area,
    wherein the first gate line and the third gate line are electrically isolated from each other in the transparent area,
    wherein the first gate line and the third gate line comprise the transparent material in the transparent area and the non-transparent material outside the transparent area,
    and wherein the camera is disposed adjacent the transparent material of the first source line, the first gate line, and the third gate line.

6. The display of claim 5, wherein the first set of gate lines is electrically isolated from the second set of gate lines in the transparent area and outside the transparent area.

7. The display of claim 5, further including a source driver to control the source lines, a first gate driver to control the first set of gate lines, and a second driver to control the second set of gate lines.

8. The display of claim 5, wherein the second brightness is approximately twice the first brightness.

9. The display of claim 5, wherein the second brightness is approximately 50% greater than the first brightness.

10. The display of claim 7, wherein the first gate driver controls the first gate line independently from the second gate driver that controls the second gate line.

11. The display of claim 5, wherein the first gate line and the third gate line are electrically isolated from each other in the transparent area via a gap between the first gate line and the third gate line in the transparent area.

12. A non-transitory computer-readable medium comprising instructions to direct a processor to:

capture images by a camera positioned behind transparent pixels of a display having both non-transparent pixels and the transparent pixels;

disable the transparent pixels during image capture by the camera;

drive the non-transparent pixels at a first brightness; and drive the transparent pixels at a second brightness greater than the first brightness when not disabled using gate lines that respectively extend from opposite sides of the display towards each other into a transparent area and using a source line, the gate lines electrically isolated from each other in the transparent area, the gate lines and the source line comprising transparent material in the transparent area and non-transparent material outside the transparent area, and the gate lines and the source line having respective terminating ends located in the transparent area and that comprise the transparent material in the transparent area.

13. The non-transitory computer-readable medium of claim 12, wherein the instructions direct the processor to further capture images at duty cycle of 1:1 and drive the transparent pixels at the second brightness that is twice the first brightness.

14. The non-transitory computer-readable medium of claim 12, where the instructions direct the processor to further capture images at duty cycle of 1:2 and drive the transparent pixels at the second brightness that is approximately 50% greater than the first brightness.

15. The method of claim 1, wherein the gate lines that extend from the opposite sides of the display towards each other into the transparent area at least partially form a common row or common column of the display.

16. The display of claim 5, wherein the first gate line and the third gate line that extend from the opposite sides of the display towards each other into the transparent area at least partially form a common row or common column of the display.

17. The non-transitory computer-readable medium of claim 12, wherein the gate lines that extend from the opposite sides of the display towards each other into the transparent area at least partially form a common row or common column of the display.

* * * * *